United States Patent
Tao et al.

(10) Patent No.: US 9,979,471 B2
(45) Date of Patent: May 22, 2018

(54) METHOD AND APPARATUS FOR MEASURING A FILTERING CHARACTERISTIC, PRE-EQUALIZER AND COMMUNICATION EQUIPMENT

(71) Applicant: FUJITSU LIMITED, Kawasaki (JP)

(72) Inventors: Zhenning Tao, Beijing (CN); Yangyang Fan, Beijing (CN); Liang Dou, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 0 days. days.

(21) Appl. No.: 15/375,493

(22) Filed: Dec. 12, 2016

(65) Prior Publication Data

US 2017/0170896 A1 Jun. 15, 2017

(30) Foreign Application Priority Data

Dec. 11, 2015 (CN) .......................... 2015 1 0920195

(51) Int. Cl.
*H04B 10/079* (2013.01)
*H04B 10/516* (2013.01)
(Continued)

(52) U.S. Cl.
CPC ... *H04B 10/07955* (2013.01); *H04B 10/5161* (2013.01); *H04B 17/101* (2015.01); *H04L 25/03343* (2013.01); *H04L 27/01* (2013.01)

(58) Field of Classification Search
CPC .......... H04B 10/07955; H04B 10/5161; H04B 17/101; H04B 10/077; H04B 10/00;
(Continued)

(56) References Cited

U.S. PATENT DOCUMENTS

2005/0009471 A1* 1/2005 Paul ..................... H04B 17/309
455/62
2011/0255861 A1* 10/2011 Bruno ................. G01M 11/335
398/16

(Continued)

OTHER PUBLICATIONS

Danish Rafique et al., "Digital Preemphasis in Optical Communication Systems: On the DAC Requirements for Terabit Transmission Applications", Journal of Lightwave Technology, vol. 32, No. 19, Oct. 1, 2014, pp. 3247.

(Continued)

*Primary Examiner* — Ted Wang
(74) *Attorney, Agent, or Firm* — Staas & Halsey LLP

(57) ABSTRACT

A method and apparatus for measuring a filtering characteristic, pre-equalizer and communication equipment. Wherein, the apparatus for measuring a filtering characteristic includes: a first measuring unit configured to measure multiple pieces of first average power of multiple first signals obtained after multiple first transmission signals pass through a transmitting end filtering module and are modulated, frequencies of the multiple first transmission signals being different; and a first processing unit configured to determine a filtering characteristic of the transmitting end according to the first average power, amplitudes of the first transmission signals and a first predefined correspondence relationship between average power of signals after passing through the transmitting end filtering module and being modulated and a product of amplitudes of the signals and the filtering characteristic of the transmitting end.

12 Claims, 6 Drawing Sheets

(51) Int. Cl.
*H04L 27/01* (2006.01)
*H04L 25/03* (2006.01)
*H04B 17/10* (2015.01)

(58) Field of Classification Search
CPC ............... H04L 27/01; H04L 25/03343; H04J 14/0221; H04J 14/0227
See application file for complete search history.

(56) References Cited

U.S. PATENT DOCUMENTS

2013/0330070 A1    12/2013  Yu
2014/0334828 A1    11/2014  Yu et al.

OTHER PUBLICATIONS

Antonio Napoli et al., "Novel DAC digital pre-emphasis algorithm for next-generation flexible optical transponders", OFC2015 Th3G.6.
Xiang Zhou et al., "64-Tb/s, 8 b/s/Hz, PDM-36QAM Transmission Over 320 km Using Both Pre- and Post-Transmission Digital Signal Processing", Journal of Lightwave Technology, vol. 29, No. 4, Feb. 15, 2011, pp. 571.
Zhensheng Jia et al., "Performance Analysis of Pre- and Post-Compensation for Bandwidth-Constrained Signal in High-Spectral-Efficiency Optical Coherent Systems", OFC2014, W3K.3.
Juan Qi et al., "Generation of 28GBaud and 32GBaud PDM-Nyquist-QPSK by a DAC with 11.3GHz Analog Bandwidth", OFC2013, OTh1 F.1.

* cited by examiner

METHOD AND APPARATUS FOR MEASURING A FILTERING CHARACTERISTIC, PRE-EQUALIZER AND COMMUNICATION EQUIPMENT

CROSS-REFERENCE TO RELATED APPLICATIONS

This application claims the priority benefit of Chinese Patent Application No. 201510920195.6, filed on Dec. 11, 2015 in the Chinese Intellectual Property Office, the disclosure of which is incorporated herein in its entirety by reference.

BACKGROUND

1. Field

The present disclosure relates to the field of communications, and in particular to a method and apparatus for measuring a filtering characteristic, pre-equalizer and communication equipment.

2. Description of the Related Art

As the requirements of an optical communication system on low cost, miniature and flexible configuration, optical and electrical bandwidths of a transmitter of the optical communication system are reduced for various reasons. Currently, a problem of narrow bandwidth may be overcome by using pre-equalization, pre-distortion and pre-emphasis technologies in a digital domain.

FIG. 1 is a schematic diagram of a transceiver in the prior art using the digital pre-equalization technology. As shown in FIG. 1, the transmitter 100 includes an emitter 101, a pre-equalizer 102, a digital-to-analog converting module 103, a laser 105, an optical modulator 104, an optical coherent demodulator 106, an local laser 107, an analog-to-digital converting module 108 and a receiving device 109, the optical modulator 104 including a pluggable interface, and an electrical driving amplifier, etc. Wherein, the emitter 101 emits digital electrical signals, the pre-equalizer 102 pre-compensates for a filtering damage to the emitted digital electrical signals brought about by subsequent filtering modules of the transmitting end, such as the digital-to-analog converting module 103 and the optical modulator 104, the compensated digital electrical signals are converted into analog electrical signals after passing through the digital-to-analog converting module 103, and optical signals are outputted after the analog signals are modulated by the optical modulator 104. The outputted optical signals are demodulated into analog electrical signals by the optical coherent demodulator 106, and the analog electrical signals are converted into digital electrical signals by the analog-to-digital converting module 108, and the receiving device 109 receives the above digital electrical signals. Here, the filtering damage brought about by the subsequent modules after the pre-equalizer 102 in the transceiver, i.e. the digital-to-analog converting module 103 and the optical modulator 104, is referred to as a filtering characteristic of a transmitting end.

Currently, a common frequency domain or time domain method may be used for pre-equalization, and a coefficient of a pre-equalizer may be obtained by using many methods in the prior art, such as zero forcing, and minimum mean square error, etc.; however, a filtering characteristic of a transmitting end needs to be known to these methods.

It should be noted that the above description of the background art is merely provided for clear and complete explanation of the present disclosure and for easy understanding by those skilled in the art. And it should not be understood that the above technical solution is known to those skilled in the art as it is described in the background art of the present disclosure.

SUMMARY

Additional aspects and/or advantages will be set forth in part in the description which follows and, in part, will be apparent from the description, or may be learned by practice of the embodiments.

At present, instruments are often used to measure a filtering characteristic of a transmitting end or a receiving end, which is high in cost, and is hard in large-scale use.

Embodiments of the present disclosure provide a method and apparatus for measuring a filtering characteristic, pre-equalizer and communication equipment. In the method, the filtering characteristic of the transmitting end may be determined by the transmitter and the receiver themselves, that is, the signals passing through the filtering modules and the characteristic of the optical modulator, with no need of use of extra instrument, thereby avoiding the problems of high cost and uneasy large-scale use brought about by measurement of filtering characteristic by using instruments.

The above aim of the embodiments of the present disclosure is achieved by the following technical solutions.

According to a first aspect of the embodiments of the present disclosure, there is provided an apparatus for measuring a filtering characteristic, including:

a first measuring unit configured to measure multiple pieces of first average power of multiple first signals obtained after multiple first transmission signals pass through a transmitting end filtering module and are modulated, frequencies of the multiple first transmission signals being different; and a first processing unit configured to determine a filtering characteristic of the transmitting end according to the first average power, amplitudes of the first transmission signals and a first predefined correspondence relationship between average power (P) of signals after passing through the transmitting end filtering module and being modulated and a product $(A \times G(f))$ of amplitudes (A) of the signals and the filtering characteristic $G(f)$ of the transmitting end.

According to a second aspect of the embodiments of the present disclosure, there is provided a pre-equalizer, including:

a characteristic measuring unit configured to measure multiple pieces of first average power of multiple first signals obtained after multiple first transmission signals pass through a transmitting end filtering module and are modulated, frequencies of the multiple first transmission signals being different, and determine a filtering characteristic of the transmitting end according to the first average power, amplitudes of the first transmission signals and a first predefined correspondence relationship between average power (P) of signals after passing through the transmitting end filtering module and being modulated and a product $(A \times G(f))$ of amplitudes (A) of the signals and the filtering characteristic $G(f)$ of the transmitting end; and a pre-equalizing unit configured to determine a coefficient of the pre-equalizer according to the filtering characteristic of the transmitting end, and perform pre-equalization on the transmission signals by using the coefficient of the pre-equalizer According to a third aspect of the embodiments of the present disclosure, there is provided communication equipment, including the apparatus for measuring a filtering characteristic as described in the first aspect.

An advantage of the embodiments of the present disclosure exists in that the filtering characteristic of the transmitting end may be determined by the transmitter and the receiver themselves, that is, the signals passing through the filtering modules and the characteristic of the optical modulator, with no need of use of extra instrument, thereby avoiding the problems of high cost and uneasy large-scale use brought about by measurement of filtering characteristic by using instruments.

With reference to the following description and drawings, the particular embodiments of the present disclosure are disclosed in detail, and the principle of the present disclosure and the manners of use are indicated. It should be understood that the scope of the embodiments of the present disclosure is not limited thereto. The embodiments of the present disclosure contain many alternations, modifications and equivalents within the spirits and scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising/includes/including" when used in this specification is taken to specify the presence of stated features, integers, steps or components but does not preclude the presence or addition of one or more other features, integers, steps, components or groups thereof.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. To facilitate illustrating and describing some parts of the disclosure, corresponding portions of the drawings may be exaggerated or reduced. Elements and features depicted in one drawing or embodiment of the disclosure may be combined with elements and features depicted in one or more additional drawings or embodiments. Moreover, in the drawings, like reference numerals designate corresponding parts throughout the several views and may be used to designate like or similar parts in more than one embodiment.

In the drawings.

DETAILED DESCRIPTION

Figure 1:
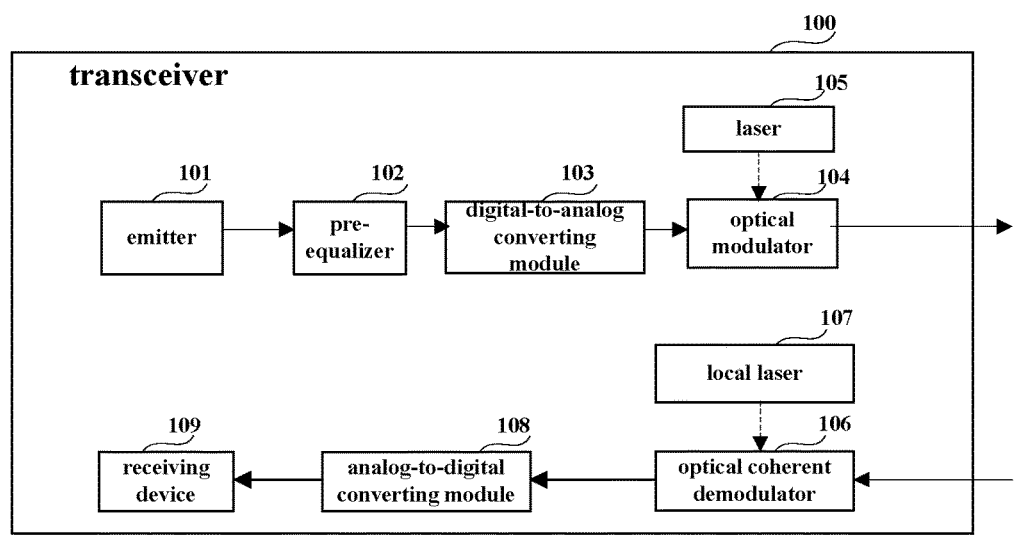
FIG. 1 is a schematic diagram of a transceiver in the prior art using the digital pre-equalization technology.

Reference will now be made in detail to the embodiments, examples of which are illustrated in the accompanying drawings, wherein like reference numerals refer to the like elements throughout. The embodiments are described below by referring to the figures.

These and further aspects and features of the embodiments will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the spirit and terms of the appended claims. Various embodiments of the present disclosure shall be described below with reference to the accompanying drawings.

In these embodiments, the filtering characteristic of the transmitting end refers to a filtering damage brought about by a filtering module of a transmitter or a filtering module of a transmitting end of a transceiver, which is denoted by $G(f)$.

In the known art, instruments are often used to measure the filtering characteristic of the transmitting end or the receiving end, which is high in cost, and is hard in large-scale use. It was found by the inventors in the implementation of the present disclosure that when a pre-equalizer of a transmitting end of a transmitter or a transceiver is out of work, the transmitting end transmits a transmission signal of an amplitude A and a central frequency f. A to-be-modulated signal is obtained after the transmission signal passes through a transmitting end filtering module. An amplitude of the signal is $A \times G(f)$, and according to a characteristic of an optical modulator, average power P of the modulated signal is determined by $A \times G(f)$, that is, there exists a correspondence relationship between P and $A \times G(f)$. Hence, by transmitting multiple transmission signals of different frequencies and measuring average power P of each transmission signal respectively passing through filtering modules and being modulated, the filtering characteristic $G(f)$ of the transmitting end may be obtained according to the correspondence relationship. Hence, in the method for measuring a filtering characteristic of the embodiments of the present disclosure, the filtering characteristic of the transmitting end may be determined by the transmitter and the transceiver themselves, that is, the signals passing through the filtering modules and the characteristic of the optical modulator, with no need of use of extra instrument, thereby avoiding the problems of high cost and uneasy large-scale use brought about by measurement of filtering characteristic by using instruments. Particular implementations of the present disclosure shall be described below with reference to the accompanying drawings.

Embodiment 1

Figure 2:
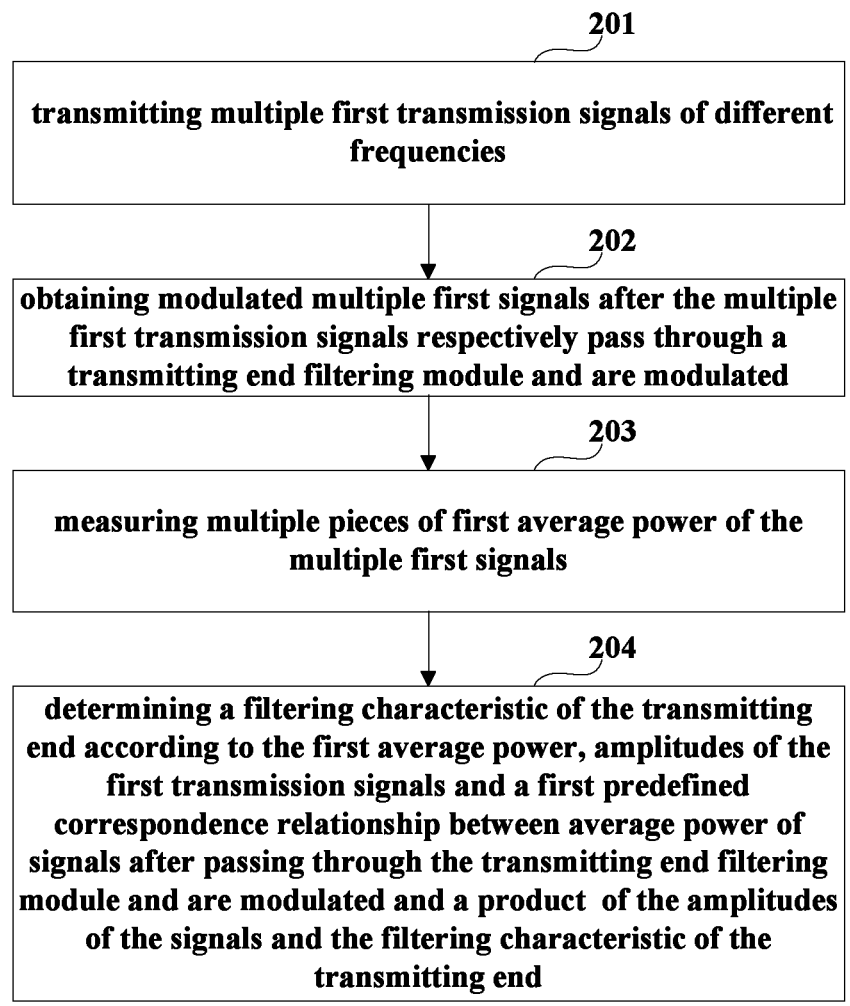
FIG. 2 is a flowchart of a method for measuring a filtering characteristic of Embodiment 1.

FIG. 2 is a flowchart of the method for measuring a filtering characteristic of Embodiment 1. Referring to FIG. 2, the method includes:

step 201: transmitting multiple first transmission signals of different frequencies;

step 202: obtaining modulated multiple first signals after the multiple first transmission signals respectively pass through a transmitting end filtering module and are modulated;

step 203: measuring multiple pieces of first average power of the multiple first signals; and step 204: determining a filtering characteristic of the transmitting end according to the first average power, amplitudes of the first transmission signals and a first predefined correspondence relationship between average power (P) of signals after passing through the transmitting end filtering module and are modulated and a product (A×G(f)) of the amplitudes (A) of the signals and the filtering characteristic G(f) of the transmitting end.

It can be seen from this embodiment that the filtering characteristic of the transmitting end may be determined by using the multiple signals passing through the filtering module of the transmitter or the transceiver and the characteristic of the optical modulator, that is, the transmitter and the transceiver themselves, with no need of use of extra instrument, thereby avoiding the problems of high cost and uneasy large-scale use brought about by measurement of filtering characteristic by using instruments.

In this embodiment, the first transmission signal in step 201 is denoted by S(f), which may be a narrowband signal. A narrowband signal refers to a signal of a small bandwidth relative to that of the system; wherein, a level that the bandwidth of the signal is relatively small is related to a frequency resolution indicating a filtering characteristic; and wherein, filtering characteristic is deemed as being identical within the frequency resolution, and when the bandwidth of the signal is less than the frequency resolution, the signal may be deemed as a narrowband signal.

In this embodiment, the narrowband signal may be a direct current signal, a single-frequency signal, or a pseudo-random signal of a low Baud rate; for example, the single-frequency signal may be single-frequency real signal, or a single-frequency pure imaginary signal, and the pseudo-random signal of a low Baud rate may be a random real signal, a random pure imaginary signal, or a random complex signal, etc., and this embodiment is not limited thereto.

In this embodiment, the amplitudes of the multiple first transmission signals may be identical or different; wherein, in order to improve accuracy of the measured first average power, when the amplitudes of the multiple first transmission signals are different, the amplitudes of the first transmission signals are set to be increasing as increase of frequencies of the first transmission signals, or, in other words, increasing as decrease of G(f). This is because that when the frequencies of the first transmission signals are relatively large, G(f) is relatively small, then A×G(f) is relatively small, that is, the average power P is also relatively small, which results in that a measurement error is relative large. Hence, when the frequencies are relatively large, the amplitudes of the first transmission signals are set to be also large, thereby increasing the average power and reducing measurement errors.

In this embodiment, in step 201, an emitter of a transmitter or a transceiver may be used to transmit the first transmission signals; in step 202, the transmitting end filtering module is a transmitting end filtering module of a transmitter or a transceiver of which a transmitting end filtering characteristic is to be measured. Taking the transceiver 100 shown in FIG. 1 as an example, when the transmitting end filtering characteristic is measured, the pre-equalizer 102 of the transceiver 100 is disabled, and the emitter 101 transmits the multiple first transmission signals of different frequencies (i.e. first measurement signals) respectively, the amplitudes of the first transmission signals being identical or different. The modulated multiple first signals are obtained after the multiple first transmission signals respectively pass through the transmitting end filtering module and are modulated, such as passing through the digital-to-analog converter 103 and the optical modulator 104. It should be noted that the transceiver 100 shown in FIG. 1 is an example only, this embodiment is not limited to the above structure, and the transceiver and the filtering module may contain other parts as needed, which shall not be enumerated herein any further.

In this embodiment, in step 201, when the above first transmission signals are transmitted, the original emitter of the transmitter or the transceiver is reused; and furthermore, a specifically provided emitter may also be used to transmit the transmission signals. Then the first measurement signals are made to pass through the transmitting end filtering module, without passing through the pre-equalizer.

In this embodiment, in step 203, a photodetector may be used to sequentially measure the multiple pieces of first average power of the multiple first signals obtained in step 202; and in step 204, the filtering characteristics of the transmitting end corresponding to different frequency points may be obtained according to the first predefined correspondence relationship, and a final filtering characteristic of the transmitting end may be determined according to the multiple filtering characteristics of the transmitting end.

For example, assuming that it is predetermined to use n frequency points to determine the filtering characteristic of the transmitting end, in step 201, n first transmission signals of different frequencies are transmitted, which are denoted by $S_{11}(f), S_{12}(f), \ldots, S_{1n}(f)$, with their amplitudes being $A_{11}$, $A_{12}, \ldots, A_{1n}$, respectively, which may be identical or different; in step 202, n modulated first signals may be obtained after the n signals pass through the filtering module and are modulated, respectively, for example, the modulated first signals are denoted by $S_{11}'(f), S_{12}'(f), \ldots, S_{1n}'(f)$; in step 203, average power of the n modulated first signals is measured, for example, the average power is denoted by $P_{11}$, $P_{12}, \ldots, P_{1n}$; and in step 204, the filtering characteristics of the transmitting end to which n different frequency points correspond are determined according to the above obtained n pieces of average power, the amplitudes of the signals and the above first predefined correspondence relationship (expressed as R(P,A×G(f))), which are denoted by $G_{11}(f)$, $G_{12}(f), \ldots, G_{1n}(f)$, so as to determine the final filtering characteristic G(f) of the transmitting end according to the filtering characteristics of the transmitting end to which n different frequency points correspond.

In this embodiment, the transmitter or the transceiver itself may be used to measure the filtering characteristic of the transmitting end in a simple method and at a low cost. Furthermore, the transmitter or the transceiver themselves is not used, and measurement instrument containing an emitter and a filtering module (identical to the filtering module of the transmitter or the transceiver of which a transmitting end filtering characteristic is to be measured) but containing no pre-equalizer is used. The first transmission signals are transmitted by the emitter of the measurement instrument, and then pass through the filtering module of the measurement instrument.

In this embodiment, alternatively, the method may further include a step of (not shown): determining the first predefined correspondence relationship R(P,A×G(f)).

In an implementation, the first predefined correspondence relationship R(P,A×G(f)) may be determined through measurement.

Figure 3:
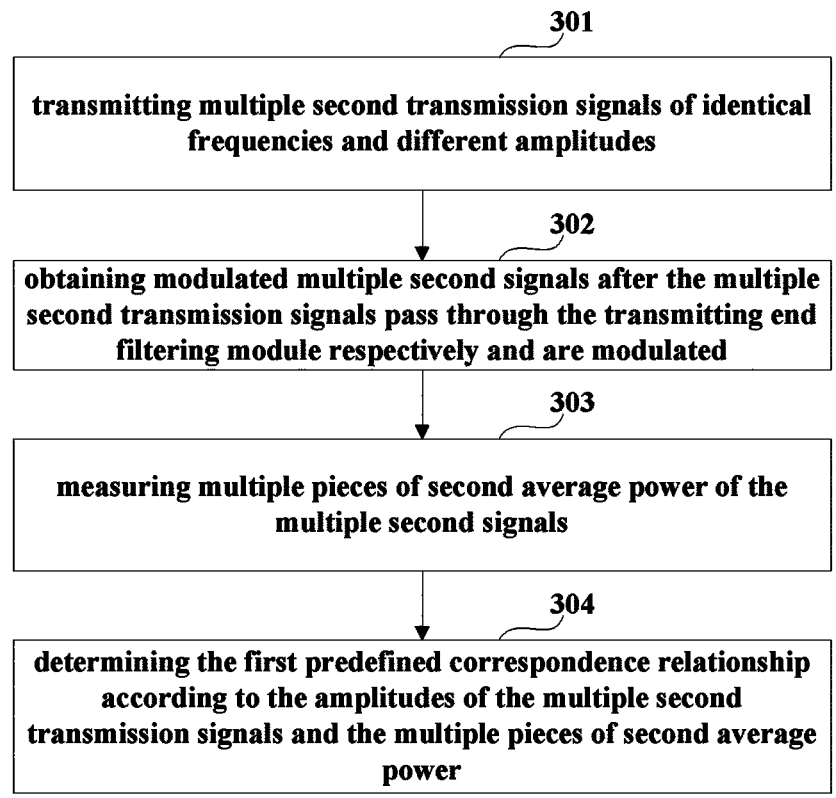
FIG. 3 is a flowchart of an implementation of determining a first predefined correspondence relationship in Embodiment 1.

FIG. 3 is a flowchart of an implementation of determining the first predefined correspondence relationship in this embodiment. As shown in FIG. 3, the method includes:

step 301: transmitting multiple second transmission signals (second measurement signals) of identical frequencies and different amplitudes;

step 302: obtaining modulated multiple second signals after the multiple second transmission signals pass through the transmitting end filtering module respectively and are modulated;

step 303: measuring multiple pieces of second average power of the multiple second signals; and step 304: determining the first predefined correspondence relationship according to the amplitudes of the multiple second transmission signals and the multiple pieces of second average power.

In this embodiment, steps 301 and 302 are similar to steps 201 and 202, which shall not be described herein any further.

In this embodiment, the second transmission signals $S_2(f)$ may be narrowband signals, and their particular types are similar to those of the first transmission signals, which shall not be described herein any further.

For example, in step 301, n second transmission signals of identical frequencies $f_0$ and different amplitudes are transmitted, which are denoted by $S_{21}(f_0), S_{22}(f_0), \ldots, S_{2n}(f_0)$, with their amplitudes being $A_{21}, A_{22}, \ldots, A_{2n}$, respectively.

In step 302, n modulated second signals may be obtained after the n second transmission signals pass through the filtering module and are modulated, respectively, for example, the modulated second signals are denoted by $S_{21}'(f_0), S_{22}'(f_0), \ldots, S_{2n}'(f_0)$; in this embodiment, when the second transmission signals are narrowband signals, $G(f_0)$ may be deemed as being 1, hence, the second signals $S_{2i}'(f_0)=S_{2i}(f_0)\times G(f_0)=S_{2i}(f_0)$, i being from 1 to n.

In step 303, multiple pieces of second average power of the multiple second signals are measured by using a photodetector, and may be denoted by $P_{21}, P_{22}, \ldots, P_{2n}$.

And in step 304, the correspondence relationship between the multiple pieces of second average power and the multiple amplitudes is determined according to the multiple pieces of second average power and corresponding amplitudes of the second transmission signals; wherein, as the average power P of the modulated signals is determined by A×G(f), and $G(f_0)$ is deemed as being 1, the correspondence relationship between the multiple pieces of average power and the multiple amplitudes is equivalent to the above first correspondence relationship R(P,A×G(f)).

In another implementation, the first correspondence relationship R(P,A×G(f)) may be determined according to a parameter of the transmitter or the transceiver.

For example, when the demodulator is a Mach-Zehnder modulator (MZM), the first correspondence relationship is $$P = 0.5 - 0.5 J_0\left(\frac{A\pi G(f)}{V_{pi}}\right);$$

where, $V_{pi}$ denotes a voltage needed by a phase change π of the MZM, P denotes the average power of the modulated signals, G(f) denotes the filtering characteristic of the transmitting end, A denotes the amplitudes of the signals, and $J_0(\ )$ denotes a Bessel function. As this is for an MZM, for example, when the transmission signal is A sin(2πft)G(f), modulated low-pass signal is expressed as sin(Aπ sin(2πft) G(f)/2$V_{pi}$), and at this moment, optical instantaneous power is:

$$\left|\sin\left(\frac{A\pi\sin(2\pi ft)G(f)}{2V_{pi}}\right)\right|^2 = 0.5 - 0.5\cos\left(\frac{A\pi\sin(2\pi ft)G(f)}{V_{pi}}\right) =$$

$$0.5 - 0.5J_0\left(\frac{A\pi G(f)}{V_{pi}}\right) - \sum_{n=1}^{\infty} J_{2n}\left(\frac{A\pi G(f)}{V_{pi}}\right)\cos(2n2\pi ft),$$

i.e. $P = 0.5 - 0.5J_0\left(\frac{A\pi G(f)}{V_{pi}}\right).$

In this embodiment, alternatively, when emitters and filtering modules of the transmitter or the transceiver are used in steps 201 and 202, the method may further include: setting a pre-equalizer of the transmitter or the transceiver, so as to disable the pre-equalizer.

It can be seen from this embodiment that the filtering characteristic of the transmitting end may be determined by the transmitter and the transceiver themselves, that is, the amplitude of the first transmission signal and the characteristic of the optical modulator, with no need of use of extra instrument, thereby avoiding the problems of high cost and uneasy large-scale use brought about by measurement of filtering characteristic by using instruments.

Embodiment 2

Embodiment 2 of the present disclosure provides an apparatus for measuring a filtering characteristic. As a principle of the apparatus for solving problems is similar to that of the method in Embodiment 1, the implementation of the method in Embodiment 1 may be referred to for implementation of the apparatus, and repeated parts shall not be described herein any further.

Figure 4:
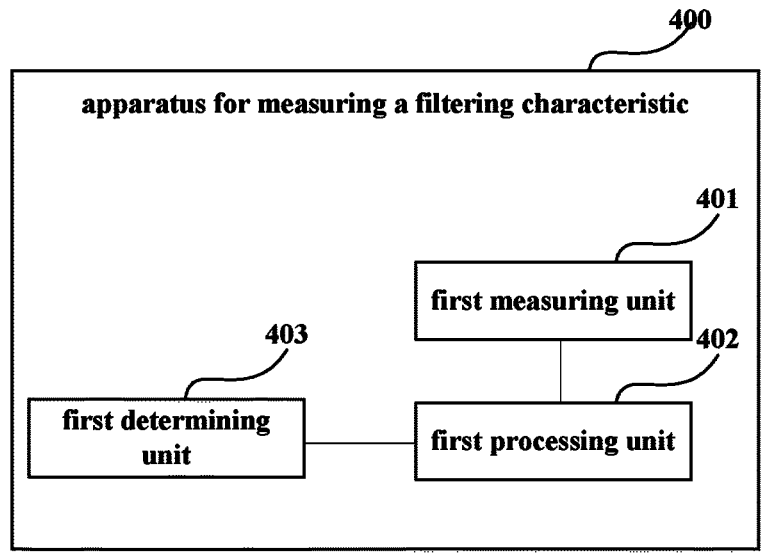
FIG. 4 is a schematic diagram of a structure of an apparatus for measuring a filtering characteristic in Embodiment 2.

FIG. 4 is a schematic diagram of an implementation of the apparatus of Embodiment 2. As shown in FIG. 4, the apparatus 400 which may be a CPU (see FIG. 7) includes:

a first measuring unit 401 configured to measure multiple pieces of first average power of multiple first signals obtained after multiple first transmission signals pass through a transmitting end filtering module and are modulated, frequencies of the multiple first transmission signals being different; and a first processing unit 402 configured to determine a filtering characteristic of the transmitting end according to the first average power, amplitudes of the first transmission signals and a first predefined correspondence relationship between average power (P) of signals after passing through the transmitting end filtering module and being modulated and a product (A×G(f)) of amplitudes (A) of the signals and the filtering characteristic G(f) of the transmitting end.

In this embodiment, steps 203-204 in Embodiment 1 may be referred to for particular implementations of the first measuring unit 401 and the first processing unit 402, which shall not be described herein any further.

In this embodiment, alternatively, the apparatus may further include a first determining unit 403 configured to determine the first predefined correspondence relationship.

In an embodiment, the first determining unit 403 may obtain the first predefined correspondence relationship through measurement, in which case a structure of the first determining unit 403 is as follows.

Figure 5:
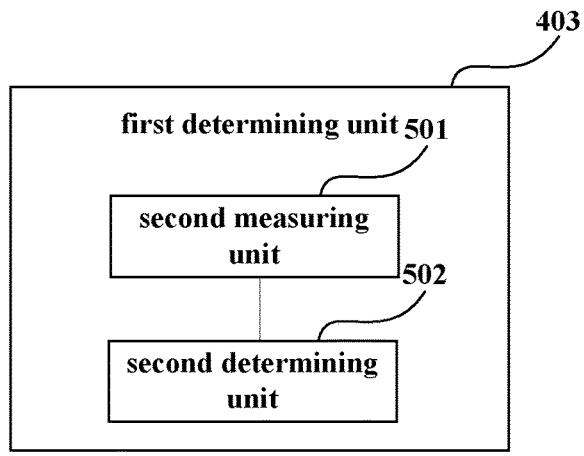
FIG. 5 is a schematic diagram of a structure of a first determining unit in Embodiment 2.

FIG. 5 is a schematic diagram of a structure of an implementation of the first determining unit 403. As shown in FIG. 5, the first determining unit 403 includes:

- a second measuring unit 501 configured to measure multiple pieces of second average power of multiple second signals obtained after multiple second transmission signals pass through the transmitting end filtering module and are modulated, frequencies of the multiple second transmission signals being identical, and their amplitudes being different; and
- a second determining unit 502 configured to determine the first predefined correspondence relationship according to the amplitudes of the multiple second transmission signals and the multiple pieces of second average power.

In this embodiment, steps 303-304 in Embodiment 1 may be referred to for particular implementations of the second measuring unit 501 and the second determining unit 502, which shall not be described herein any further.

In another embodiment, the first determining unit 403 may determine the first predefined correspondence relationship according to a parameter of a transmitter or a transceiver, in which case the first determining unit 403 is configured to determine the first predefined correspondence relationship as $$P = 0.5 - 0.5 J_0\left(\frac{A\pi G(f)}{V_{pi}}\right)$$

when a modulator is an MZM; where, $V_{pi}$ denotes a voltage needed by a phase change $\pi$ of the MZM, P denotes the average power of the modulated signals, $G(f)$ denotes the filtering characteristic of the transmitting end, A denotes the amplitudes of the signals, and $J_0()$ denotes a Bessel function.

In this embodiment, the amplitudes of the multiple first transmission signals are identical or different; wherein, when the amplitudes of the multiple first transmission signals are different, the amplitudes of the first transmission signals increase as increase of frequencies of the first transmission signals, an effect of which being as that described in Embodiment 1, which shall not be described herein any further.

In this embodiment, the first transmission signals and the second transmission signals may be narrowband signals, which are as those described in Embodiment 1, the contents of which being incorporated herein, and being not going to be described herein any further.

In this embodiment, alternatively, when an emitter and a filtering module of the transmitter or the transceiver are used, the apparatus 400 may further include a setting unit (not shown) configured to set a pre-equalizer of the transmitter or the transceiver, so as to disable the pre-equalizer. However, this embodiment is not limited thereto, and the setting unit may also be provided in a transmitter, a receiver, or a transceiver.

In this embodiment, the first transmission signals may be transmitted by an emitter of communication equipment, such as a transmitter or a transceiver, of which a filtering characteristic is to be measured, and pass through filtering modules of the transmitting end of the communication equipment of which a filtering characteristic is to be measured; then the filtering characteristic of the transmitting end is determined by the apparatus 400 according to the acquired first signals.

In this embodiment, the first measuring unit 401 may be carried out by a photodetector PD.

It can be seen from this embodiment that the filtering characteristic of the transmitting end may be determined by the transmitter and the transceiver themselves, that is, the amplitude of the transmission signals, the power of the modulated signals and the characteristic of the optical modulator, with no need of use of extra instrument, thereby avoiding the problems of high cost and uneasy large-scale use brought about by measurement of filtering characteristic by using instruments.

Embodiment 3

An embodiment of the present disclosure further provides a communication system, including the apparatus 400 for measuring a filtering characteristic as described in Embodiment 2, and further including communication equipment, which may be a transmitter, or a transceiver.

Figure 6:
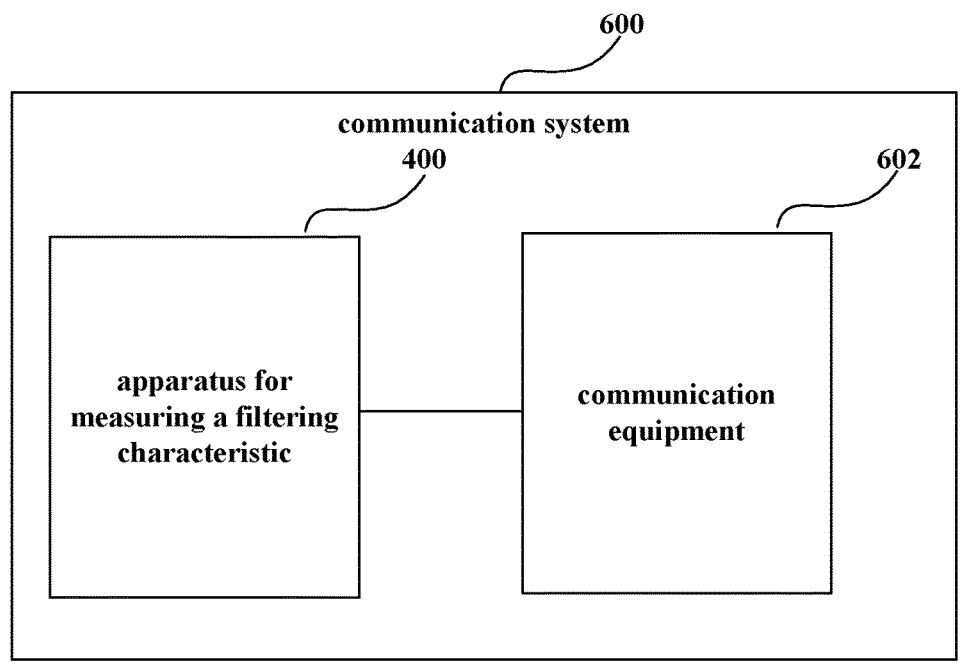
FIG. 6 is a schematic diagram of a structure of a communication system in Embodiment 3.

FIG. 6 is a schematic diagram of a structure of the communication system in Embodiment 3. As shown in FIG. 3, the communication system 600 includes the apparatus 400 for measuring a filtering characteristic as described in Embodiment 2, which is configured to measure a filtering characteristic of a transmitting end, a structure of which being as described in the above embodiment, and being not going to be described herein any further. When communication equipment 602 is a transceiver, FIG. 1 may be referred to for its structure, which shall not be described herein any further. What differs from the transceiver in FIG. 1 is that in this embodiment, an emitter in the transceiver is configured to transmit first transmission signals and/or second transmission signals; wherein, Embodiment 1 may be referred to particular implementations of the first transmission signals and the second transmission signals, which shall not be described herein any further. And when the communication equipment 602 is a transmitter, it may include the emitter 101, the pre-equalizer 102, the digital-to-analog converting module 103, the optical modulator 104 and the laser 105 shown in FIG. 1, and what differs from the emitter 101, the pre-equalizer 102, the digital-to-analog converting module 103, the optical modulator 104 and the laser 105 in FIG. 1 is that in this embodiment, the emitter in the transmitter is configured to transmit first transmission signals and/or second transmission signals; wherein, Embodiment 1 may be referred to particular implementations of the first transmission signals and the second transmission signals, which shall not be described herein any further.

In this embodiment, in measuring the filtering characteristic of the transmitting end, a pre-equalizer of the communication equipment 602 is disabled by a setting unit in the apparatus 400 for measuring a filtering characteristic of the communication system (which may also be provided in the transmitter or the receiver). Then the emitter of the communication equipment 602 transmits the first transmission signals, passing through a filtering module of a transmitting end and being modulated, so as to obtain first signals. Thereafter, the first signals are transmitted to the apparatus 400 for measuring a filtering characteristic, which determines a final filtering characteristic of the transmitting end, with a particular method being as that described in Embodiment 1, which shall not be described herein any further.

It can be seen from this embodiment that the filtering characteristic of the transmitting end may be determined by the transmitter and the transceiver themselves, that is, the amplitude of the transmission signals, the power of the modulated signals and the characteristic of the optical modulator, with no need of use of extra instrument, thereby avoiding the problems of high cost and uneasy large-scale use brought about by measurement of filtering characteristic by using instruments.

Embodiment 4

Embodiment 4 of the present disclosure further provides communication equipment, which differs from the communication equipment in Embodiment 3 that the functions of the apparatuses for measuring a filtering characteristic described in Embodiment 2 are incorporated into the communication equipment. The communication equipment may be a transmitter, or a transceiver.

Figure 7:
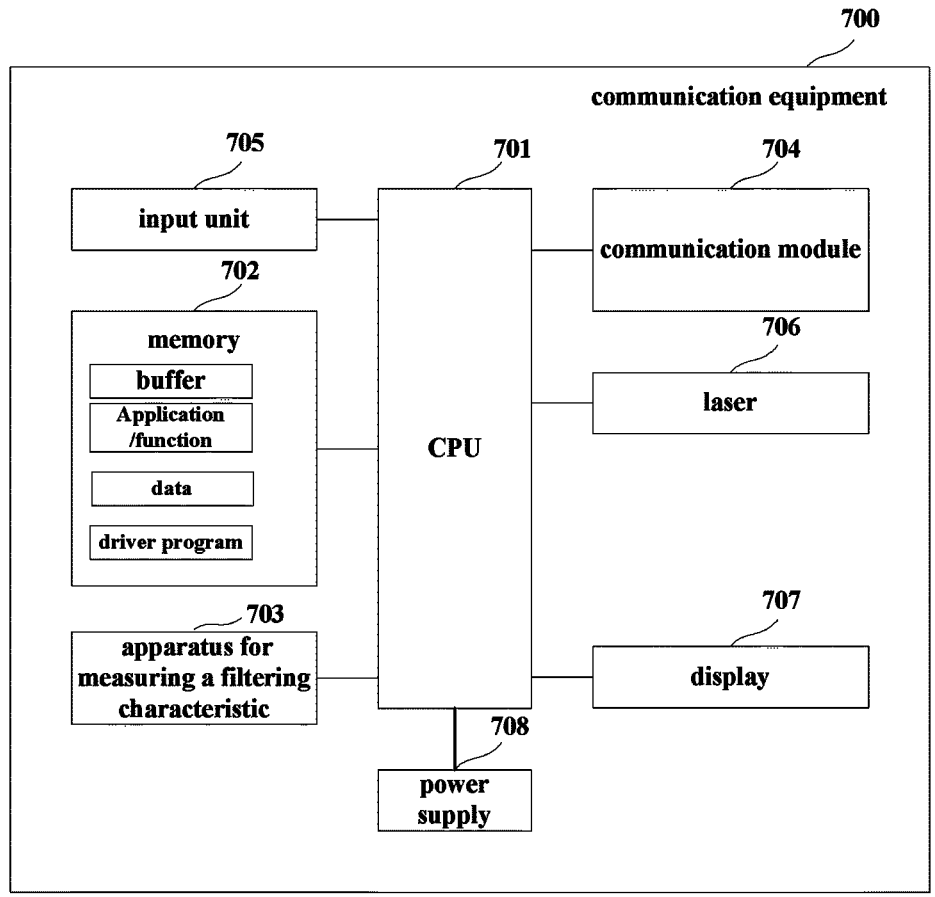
FIG. 7 is a schematic diagram of a structure of communication equipment in Embodiment 4.

FIG. 7 is a schematic diagram of the communication equipment of this embodiment. As shown in FIG. 7, the communication equipment 700 may include a central processing unit (CPU) 701 and a memory 702, the memory 702 being coupled to the central processing unit 701. It should be noted that this figure is illustrative only, and other types of structures may also be used, so as to supplement or replace this structure and achieve telecommunications function or other functions.

In an implementation, the functions of the apparatus 400 for measuring a filtering characteristic described in Embodiment 2 may be integrated into the central processing unit 701.

Wherein, the central processing unit 701 may be configured to measure multiple pieces of first average power of multiple first signals obtained after multiple first transmission signals pass through a transmitting end filtering module and are modulated, frequencies of the multiple first transmission signals being different, and determine a filtering characteristic of the transmitting end according to the first average power, amplitudes of the first transmission signals and a first predefined correspondence relationship between average power (P) of signals after passing through the transmitting end filtering module and being modulated and a product (A×G(f)) of amplitudes (A) of the signals and the filtering characteristic G(f) of the transmitting end.

Wherein, the central processing unit 701 may further be configured to determine the first predefined correspondence relationship.

In an implementation, the central processing unit 701 is configured to measure multiple pieces of second average power of multiple second signals obtained after multiple second transmission signals pass through the transmitting end filtering module and are modulated, frequencies of the multiple second transmission signals being identical, and their amplitudes being different, and determine the first predefined correspondence relationship according to the amplitudes of the multiple second transmission signals and the multiple pieces of second average power.

In another implementation, the central processing unit 701 is configured to, when a modulator is a Mach-zehnder modulator (MZM), determine the first predefined correspondence relationship as:

$$P = 0.5 - 0.5 J_0\left(\frac{A\pi G(f)}{V_{pi}}\right);$$

where, $V_{pi}$ denotes a voltage needed by a phase change $\pi$ of the Mach-zehnder modulator, P denotes average power of modulated signals, G(f) denotes the filtering characteristic of the transmitting end, A denotes the amplitudes of the signals, and $J_0(\ )$ denotes a Bessel function.

Wherein, the amplitudes of the multiple first transmission signals are identical or different.

Wherein, when the amplitudes of the multiple first transmission signals are different, the amplitudes of the first transmission signals increase as increase of frequencies of the first transmission signals.

Wherein, the first transmission signals or the second transmission signals are narrowband signals.

In a further implementation, the apparatus 400 for measuring a filtering characteristic described in Embodiment 2 and the central processing unit 701 may be configured separately. For example, the apparatus 400 may be configured as a chip connected to the central processing unit 701 (see 703 in FIG. 7), with its functions being realized under control of the central processing unit 701.

As shown in FIG. 7, the communication equipment 700 may further include a communication module 704, an input unit 705, a display 707, and a power supply 708. It should be noted that the communication equipment 700 does not necessarily include all the parts shown in FIG. 7, and furthermore, the communication equipment 700 may include parts not shown in FIG. 7, and the prior art may be referred to.

In this embodiment, the communication equipment 700 may be a transmitter, in which case the equipment 700 may further include a laser 706, and the communication module 704 is a signal transmitting module, and its structure may be identical to that of an existing transmitter, which may include, as shown in FIG. 1, an emitter 101, a pre-equalizer 102, a digital-to-analog converting module 103 and an optical modulator 104; however, the structure of the communication module 704 is not limited to the above embodiment.

In this embodiment, the communication equipment 700 may be a transceiver, in which case the equipment 700 may further include a laser 707 and a local laser (not shown), and the communication module 704 is a signal transmitting and receiving module, and its structure may be identical to that of an existing transceiver; for example, a transmitting module is similar to a transmitter; as shown in FIG. 1, the receiving module may include an optical coherent demodulator 107, an analog-to-digital converting module 108 and a receiving device 109; however, the structure of the communication module 704 is not limited to the above embodiment.

Wherein, the central processing unit 701 is further configured to control the emitter in the communication module 704 to transmit the first transmission signals and/or the second transmission signals, and make the first transmission signals and/or the second transmission signals pass through a filtering module of the transmitting end and be modulated, so as to obtain modulated first signals.

In this embodiment, the communication equipment may further include a photodetector (not shown), and the central processing unit 701 control the photodetector to measure power of the modulated first signals and/or the second signals, and determine the filtering characteristic of the transmitting end by using a measurement result.

As shown in FIG. 7, the central processing unit 701 is sometimes referred to as a controller or control, and may include a microprocessor or other processor devices and/or logic devices. The central processing unit 701 receives input and controls operations of every components of the communication equipment 700.

Wherein, the memory 702 may be, for example, one or more of a buffer memory, a flash memory, a hard drive, a mobile medium, a volatile memory, a nonvolatile memory, or other suitable devices, which may store predefined or preconfigured information, and may further store a program executing related information. And the central processing unit 701 may execute the program stored in the memory 702, so as to realize information storage or processing, etc. Functions of other parts are similar to those of the prior art, which shall not be described herein any further. The parts of the communication equipment 700 may be realized by specific hardware, firmware, software, or any combination thereof, without departing from the scope of the present disclosure.

In this embodiment, in measuring the filtering characteristic, a pre-equalizer of the communication module 704 is disabled by a setting unit in the apparatus 703 for measuring a filtering characteristic. Under the control of the CPU, the emitter of the communication module 704 transmits first transmission signals of different frequencies, which pass through the filtering modules of the transmitting end and are modulated, so as to obtain modulated first signals. Then the obtained first signals are transmitted to the apparatus 703 for measuring a filtering characteristic under control of the CPU, and the apparatus 703 determines a final filtering characteristic of the transmitting end, with a particular method being as that described in Embodiment 1, which shall not be described herein any further.

It can be seen from this embodiment that the filtering characteristic of the transmitting end may be determined by the communication equipment itself, with no need of use of extra instrument, thereby avoiding the problems of high cost and uneasy large-scale use brought about by measurement of filtering characteristic by using instruments.

Embodiment 5

Embodiment 5 of the present disclosure provides an apparatus for measuring a filtering characteristic, which differs from the apparatus 400 of Embodiment 2 in that in this embodiment, an emitter of an existing transmitter or a transceiver is not used, and only a transmitting end filtering module of an existing transmitter or transceiver is used.

Figure 8:
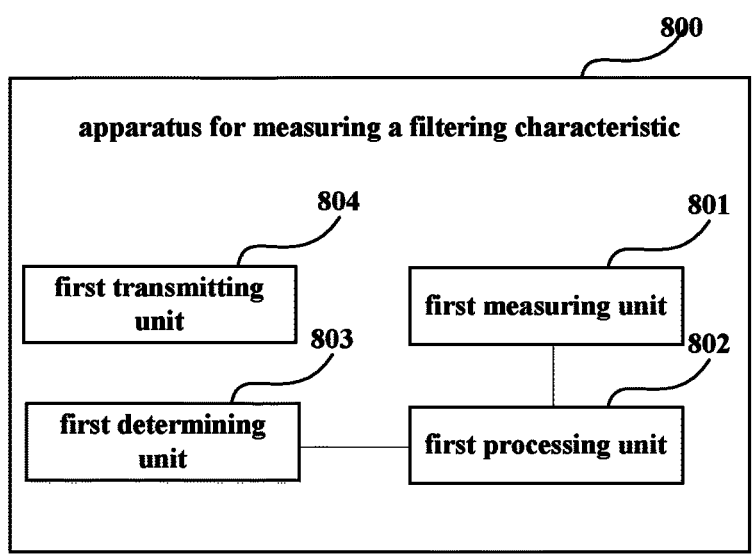
FIG. 8 is a schematic diagram of a structure of an implementation of the apparatus for measuring a filtering characteristic in Embodiment 5.

FIG. 8 is a schematic diagram of a structure of an implementation of the apparatus of Embodiment 5. As shown in FIG. 8, the apparatus 800 includes a first measuring unit 801, a first processing unit 802 and a first determining unit 803; wherein, the first measuring unit 401, the first processing unit 402 and the first determining unit 403 in Embodiment 2 may be referred to for particular implementations, which shall not be described herein any further.

In this embodiment, the apparatus 800 may further include a first transmitting unit 804 configured to transmit multiple first transmission signals of different frequencies, directly transmitting the multiple first transmission signals to a transmitting end filtering module of an existing transmitter or transceiver, so as to obtain modulated first signals. The first measuring unit 801 may obtain the first signals, and measure multiple pieces of first average power of the multiple first signals. And the first processing unit 802 determines a final filtering characteristic of the transmitting end, a particular method being as that described in Embodiment 1, and being not going to be described herein any further.

In this embodiment, the first transmitting unit 804 further configured to transmit multiple second transmission signals of different amplitudes and identical frequencies, directly transmitting the multiple second transmission signals to a transmitting end filtering module of an existing transmitter or transceiver, so as to obtain the modulated second signals, the first determining unit 803 may determine the first predefined correspondence relationship, a particular method being as that described in Embodiment 1, and being not going to be described herein any further.

In this embodiment, as it is not needed to make the first transmission signals transmitted by the first transmitting unit 804 to pass through a pre-equalizer of an existing transmitter or transceiver, the apparatus does not need to include the setting unit in Embodiment 2.

In this embodiment, the apparatus 800 for measuring a filtering characteristic transmits the multiple first transmission signals of different frequencies, transmitting the multiple first transmission signals to communication equipment (a transmitting end filtering module of the transmitter or the transceiver). Then the communication equipment receives the multiple first transmission signals transmitted by the apparatus 800, makes the multiple first transmission signals to pass through a transmitting end filtering module of a transmitter or a transceiver of themselves and be modulated, and transmits the modulated first signals to the apparatus 800, and the apparatus 800 receives the first signals fed back by the communication equipment and determines the final filtering characteristic of the transmitting end, a particular method being as that described in Embodiment 1, and being not going to be described herein any further.

It can be seen from this embodiment that the filtering characteristic of the transmitting end may be determined by the communication equipment itself, with no need of use of extra instrument, thereby avoiding the problems of high cost and uneasy large-scale use brought about by measurement of filtering characteristic by using instruments.

Embodiment 6

Embodiment 6 of the present disclosure further provides an apparatus for measuring a filtering characteristic, which differs from the apparatus 800 in Embodiment 5 in that in this embodiment, a transmitting end filtering module of an existing transmitter or transceiver is not used.

Figure 9:
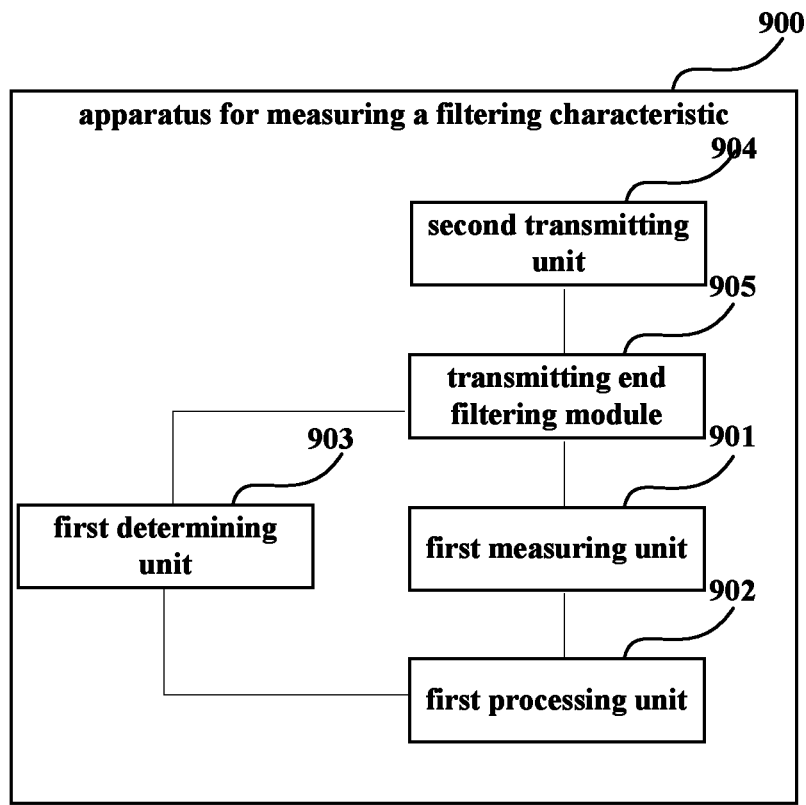
FIG. 9 is a schematic diagram of a structure of an implementation of the apparatus for measuring a filtering characteristic in Embodiment 6.

FIG. 9 is a schematic diagram of a structure of an implementation of the apparatus of Embodiment 6. As shown in FIG. 9, the apparatus 900 includes a first measuring unit 901, a first processing unit 902, a first determining unit 903 and a second transmitting unit 904; wherein, the first measuring unit 801, the first processing unit 802, the first determining unit 803 and the first transmitting unit 804 in Embodiment 5 may be referred to for particular implementations, which shall not be described herein any further.

In this embodiment, the apparatus 900 may further include a transmitting end filtering module 905, which is identical to a filtering module of a transmitter or a transceiver of which a transmitting end filtering characteristic is to be measured. The second transmitting unit 904 transmits the multiple first transmission signals to the transmitting end filtering module 905 and the multiple first transmission signals are modulated, so as to obtain modulated first signals. Then the first measuring unit 901 measures multiple pieces of first average power of the multiple first signals. And the first processing unit 902 determines a final filtering characteristic of the transmitting end, a particular method being as that described in Embodiment 1, and being not going to be described herein any further.

Wherein, when the first determining unit 903 determines the first predetermined correspondence relationship, the second transmitting unit 904 transmits second transmission signals of identical frequencies and different amplitudes to the transmitting end filtering module 905 and the second transmission signals are modulated, so as to obtain modulated second signals. Then the first determining unit 903 determines the first predetermined correspondence relationship, a particular method being as that described in Embodiment 1, and being not going to be described herein any further.

In this embodiment, after determining the filtering characteristic of the transmitting end, the apparatus 900 may transmit the filtering characteristic to communication equipment, such as a pre-equalizer of a transceiver or a transmitter, so that the pre-equalizer determines a pre-equalizer coefficient according to the filtering characteristic of the transmitting end, for use in pre-equalization processing.

It can be seen from this embodiment that the filtering characteristic of the transmitting end may be determined according to the average power of the modulated first signals, the amplitudes of the first transmission signals and a characteristic of the optical modulator, with no need of use of extra instrument, thereby avoiding the problems of high cost and uneasy large-scale use brought about by measurement of filtering characteristic by using instruments. And furthermore, the pre-equalizer coefficient may be obtained by using the filtering characteristic measured by using the above method, so as to use the pre-equalizer coefficient to compensate for filtering damages brought about by the filtering module.

Embodiment 7

Figure 10:
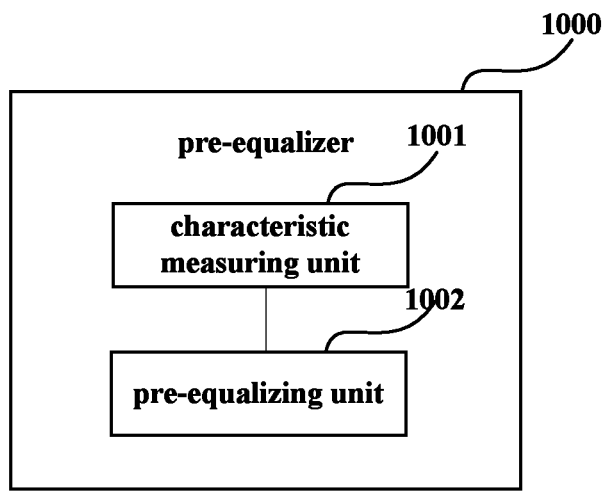
FIG. 10 is a schematic diagram of a structure of a pre-equalizer in Embodiment 7.

Embodiment 7 of the present disclosure further provides a pre-equalizer. FIG. 10 is a schematic diagram of a structure of the pre-equalizer in this embodiment. The pre-equalizer 1000 includes:
- a characteristic measuring unit 1001 including an apparatus for measuring a filtering characteristic and configured to determine a filtering characteristic of a transmitting end; and
- a pre-equalizing unit 1002 configured to determine a coefficient of the pre-equalizer according to the filtering characteristic of the transmitting end, and perform pre-equalization on transmission signals by using the coefficient of the pre-equalizer.

Wherein, any apparatus for measuring a filtering characteristic in embodiments 2, 5, 6 may be referred to for a particular implementation of the characteristic measuring unit 1001; and furthermore, the pre-equalizing unit 1002 may determine the coefficient of the pre-equalizer by using a zero-forcing method, and a minimum mean square error method, etc., and perform the pre-equalization on the transmission signal by using the coefficient and using a constant modulus algorithm, and this embodiment is not limited thereto.

Embodiment 8

Embodiment 8 further provides communication equipment, which may be a transceiver or a transmitter, and include the pre-equalizer 1000 in Embodiment 7; wherein, Embodiment 7 may be referred to for a particular implementation, which shall not be described herein any further.

It can be seen from this embodiment that the filtering characteristic of the transmitting end may be determined according to the average power of the modulated first signals, the amplitudes of the first transmission signals and a characteristic of the optical modulator, with no need of use of extra instrument, thereby avoiding the problems of high cost and uneasy large-scale use brought about by measurement of filtering characteristic by using instruments. And furthermore, the pre-equalizer coefficient may be obtained by using the filtering characteristic measured by using the above method, so as to use the pre-equalizer coefficient to compensate for filtering damages brought about by the filtering module.

An embodiment of the present disclosure further provides a non-transitory computer-readable program, wherein when the program is executed in an apparatus for measuring a filtering characteristic, the program enables a computer to carry out the method for measuring a filtering characteristic as described in Embodiment 1 in the apparatus for measuring a filtering characteristic.

An embodiment of the present disclosure provides a storage medium in which a computer-readable program is stored, wherein the computer-readable program enables a computer to carry out the method for measuring a filtering characteristic as described in Embodiment 1 in an apparatus for measuring a filtering characteristic.

The preferred embodiments of the present disclosure are described above with reference to the drawings. The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

It should be understood that each of the parts of the present disclosure may be implemented by hardware, software, firmware, or a combination thereof. In the above embodiments, multiple steps or methods may be realized by software or firmware that is stored in the memory and executed by an appropriate instruction executing system. For example, if it is realized by hardware, it may be realized by any one of the following technologies known in the art or a combination thereof as in another embodiment: a discrete logic circuit having a logic gate circuit for realizing logic functions of data signals, application-specific integrated circuit having an appropriate combined logic gate circuit, a programmable gate array (PGA), and a field programmable gate array (FPGA), etc.

For implementations of the present disclosure containing the above embodiments, following supplements are further disclosed.

Supplement 1. An apparatus for measuring a filtering characteristic, including:
a first measuring unit configured to measure multiple pieces of first average power of multiple first signals obtained after multiple first transmission signals pass through a transmitting end filtering module and are modulated, frequencies of the multiple first transmission signals being different; and
a first processing unit configured to determine a filtering characteristic of the transmitting end according to the first average power, amplitudes of the first transmission signals and a first predefined correspondence relationship between average power (P) of signals after passing through the transmitting end filtering module and being modulated and a product (A×G(f)) of amplitudes (A) of the signals and the filtering characteristic G(f) of the transmitting end.

Supplement 2. The apparatus according to supplement 1, wherein the apparatus further includes:

a first determining unit configured to determine the first predefined correspondence relationship.

Supplement 3. The apparatus according to supplement 2, wherein the first determining unit includes:

a second measuring unit configured to measure multiple pieces of second average power of multiple second signals obtained after multiple second transmission signals pass through the transmitting end filtering module and are modulated, frequencies of the multiple second transmission signals being identical, and their amplitudes being different; and a second determining unit configured to determine the first predefined correspondence relationship according to the amplitudes of the multiple second transmission signals and the multiple pieces of second average power.

Supplement 4. The apparatus according to supplement 2, wherein the first determining unit includes:

a third determining unit configured to, when a modulator is a Mach-zehnder modulator, determine the first predefined correspondence relationship as:

$$P = 0.5 - 0.5 J_0\left(\frac{A\pi G(f)}{V_{pi}}\right);$$

where, $V_{pi}$ denotes a voltage needed by a phase change $\pi$ of the Mach-zehnder modulator, P denotes average power of modulated signals, G(f) denotes the filtering characteristic of the transmitting end, A denotes the amplitudes of the signals, and $J_0( )$ denotes a Bessel function.

Supplement 5. The apparatus according to supplement 1, wherein the amplitudes of the multiple first transmission signals are identical or different.

Supplement 6. The apparatus according to supplement 5, wherein when the amplitudes of the multiple first transmission signals are different, the amplitudes of the first transmission signals increase as increase of frequencies of the first transmission signals.

Supplement 7. The apparatus according to supplement 1 or 3, wherein the first transmission signals or the second transmission signals are narrowband signals.

Supplement 8. The apparatus according to supplement 1 or 3, wherein the apparatus further includes:

a first transmitting unit configured to transmit the first transmission signals or the second transmission signals;

or the apparatus further includes a second transmitting unit and a transmitting end filtering module; wherein the second transmitting unit is configured to transmit the first transmission signals or the second transmission signals, transmit the first transmission signals or the second transmission signals passing through the transmitting end filtering module.

Supplement 9. A pre-equalizer, including:

a characteristic measuring unit configured to measure multiple pieces of first average power of multiple first signals obtained after multiple first transmission signals pass through a transmitting end filtering module and are modulated, frequencies of the multiple first transmission signals being different, and determine a filtering characteristic of the transmitting end according to the first average power, amplitudes of the first transmission signals and a first predefined correspondence relationship between average power (P) of signals after passing through the transmitting end filtering module and being modulated and a product (A×G(f)) of amplitudes (A) of the signals and the filtering characteristic G(f) of the transmitting end; and a pre-equalizing unit configured to determine a coefficient of the pre-equalizer according to the filtering characteristic of the transmitting end, and perform pre-equalization on the transmission signals by using the coefficient of the pre-equalizer.

Supplement 10. Communication equipment, including the apparatus for measuring a filtering characteristic as described in supplement 1.

Supplement 11. A method for measuring a filtering characteristic, including:

transmitting multiple first transmission signals of different frequencies;

obtaining modulated multiple first signals after the multiple first transmission signals respectively pass through a transmitting end filtering module and are modulated;

measuring multiple pieces of first average power of the multiple first signals; and determining a filtering characteristic of the transmitting end according to the first average power, amplitudes of the first transmission signals and a first predetermined correspondence relationship between average power (P) of the signals after passing through the transmitting end filtering module and being modulated and a product (A×G(f)) of the amplitudes (A) of the signals and the filtering characteristic G(f) of the transmitting end.

Supplement 12. The method according to supplement 11, wherein the method further includes:

determining the first predefined correspondence relationship.

Supplement 13. The method according to supplement 12, wherein the determining the first predefined correspondence relationship includes:

transmitting multiple second transmission signals of identical frequencies and different amplitudes;

obtaining modulated multiple second signals after the multiple second transmission signals pass through the transmitting end filtering module respectively and are modulated;

measuring multiple pieces of second average power of the multiple second signals; and determining the first predefined correspondence relationship according to the amplitudes of the multiple second transmission signals and the multiple pieces of second average power.

Supplement 14. The method according to supplement 12, wherein the determining the first predefined correspondence relationship includes:

when a modulator is a Mach-zehnder modulator, determining the first predefined correspondence relationship as:

$$P = 0.5 - 0.5 J_0\left(\frac{A\pi G(f)}{V_{pi}}\right);$$

where, $V_{pi}$ denotes a voltage needed by a phase change $\pi$ of the Mach-zehnder modulator, P denotes average power of modulated signals, G(f) denotes the filtering characteristic of the transmitting end, A denotes the amplitudes of the signals, and $J_0( )$ denotes a Bessel function.

Supplement 15. The method according to supplement 11, wherein the amplitudes of the multiple first transmission signals are identical or different.

Supplement 16. The method according to supplement 15, wherein when the amplitudes of the multiple first transmission signals are different, the amplitudes of the first transmission signals increase as increase of frequencies of the first transmission signals.

Supplement 17. The method according to supplement 13, wherein the first transmission signals or the second transmission signals are narrowband signals.

Supplement 18. The method according to supplement 18, wherein the method further includes:
determining a coefficient of a pre-equalizer according to the filtering characteristic of the transmitting end, and performing pre-equalization on the transmission signals by using the coefficient of the pre-equalizer.

Although a few embodiments have been shown and described, it would be appreciated by those skilled in the art that changes may be made in these embodiments without departing from the principles and spirit thereof, the scope of which is defined in the claims and their equivalents.

What is claimed is:

1. An apparatus for measuring a filtering characteristic, comprising:
a first measuring unit configured to measure multiple pieces of first average power of multiple first signals obtained after multiple first transmission signals pass through a transmitting end filtering module and are modulated, frequencies of the multiple first transmission signals being different; and
a first processing unit configured to determine a filtering characteristic of a transmitting end according to the first average power, amplitudes of the multiple first transmission signals and a first predefined correspondence relationship between average power (P) of filtered signals after passing through the transmitting end filtering module and being modulated and a product (A×G(f)) of amplitudes (A) of the filtered signals and the filtering characteristic G(f) of the transmitting end.

2. The apparatus according to claim 1, wherein the apparatus further comprises:
a first determining unit configured to determine the first predefined correspondence relationship.

3. The apparatus according to claim 2, wherein the first determining unit comprises:
a second measuring unit configured to measure multiple pieces of second average power of multiple second signals obtained after multiple second transmission signals pass through the transmitting end filtering module and are modulated, frequencies of the multiple second transmission signals being identical, and amplitudes of the multiple second transmission signals being different; and
a second determining unit configured to determine the first predefined correspondence relationship according to the amplitudes of the multiple second transmission signals and the multiple pieces of second average power.

4. The apparatus according to claim 3, wherein one of the first transmission signals and the second transmission signals are narrowband signals.

5. The apparatus according to claim 3, wherein one of the apparatus further comprises:
a first transmitting unit configured to transmit one of the first transmission signals and the second transmission signals;
and the apparatus further comprises:
a second transmitting unit and a transmitting end filtering module; wherein the second transmitting unit is configured to transmit one of the first transmission signals the second transmission signals, transmit one of the first transmission signals and the second transmission signals passing through the transmitting end filtering module.

6. The apparatus according to claim 2, wherein the first determining unit comprises:
a third determining unit configured to, when a modulator is a Mach-zehnder modulator, determine the first predefined correspondence relationship as:

$$P = 0.5 - 0.5 J_0\left(\frac{A\pi G(f)}{V_{pi}}\right);$$

where, $V_{pi}$ denotes a voltage needed by a phase change $\pi$ of the Mach-zehnder modulator, P denotes average power of modulated signals, G(f) denotes the filtering characteristic of the transmitting end, A denotes the amplitudes of the signals, and $J_0(\ )$ denotes a Bessel function.

7. The apparatus according to claim 1, wherein the amplitudes of the multiple first transmission signals are one of identical and different.

8. The apparatus according to claim 7, wherein when the amplitudes of the multiple first transmission signals are different, the amplitudes of the first transmission signals increase as frequencies of the first transmission signals increase.

9. The apparatus according to claim 1, wherein the one of the first transmission signals and the second transmission signals are narrowband signals.

10. The apparatus according to claim 1, wherein one of the apparatus further comprises:
a first transmitting unit configured to transmit one of the first transmission signals and the second transmission signals;
and the apparatus further comprises:
a second transmitting unit and a transmitting end filtering module; wherein the second transmitting unit is configured to transmit one of the first transmission signals and the second transmission signals, transmit one of the first transmission signals and the second transmission signals passing through the transmitting end filtering module.

11. A communication equipment, comprising the apparatus for measuring a filtering characteristic as claimed in claim 1.

12. A pre-equalizer, comprising:
a characteristic measuring unit configured to measure multiple pieces of first average power of multiple first signals obtained after multiple first transmission signals pass through a transmitting end filtering module and are modulated, frequencies of the multiple first transmission signals being different, and determine a filtering characteristic of the transmitting end according to the first average power, amplitudes of the first transmission signals and a first predefined correspondence relationship between average power (P) of filtered signals after passing through the transmitting end filtering module and being modulated and a product (A×G(f)) of amplitudes (A) of the filtered signals and the filtering characteristic G(f) of the transmitting end; and a pre-equalizing unit configured to determine a coefficient of the pre-equalizer according to the filtering characteristic of the transmitting end, and perform pre-equalization on the transmission signals by using the coefficient of the pre-equalizer.

* * * * *